United States Patent [19]

Leva et al.

[11] 4,055,610
[45] Oct. 25, 1977

[54] PREVENTING WALL LEAKAGE IN CONTACT TOWERS

[76] Inventors: Max Leva, One Hodgson Ave., Pittsburgh, Pa. 15205; Joseph L. Leva, 1485 McFarland Road, Pittsburgh, Pa. 15216

[21] Appl. No.: 589,875

[22] Filed: June 24, 1975

[51] Int. Cl.² .................... B01D 3/18; B01D 47/12
[52] U.S. Cl. .................... 261/114 R; 261/114 TC
[58] Field of Search .................... 261/97, 114 R, 113, 261/114 TC

[56] References Cited

U.S. PATENT DOCUMENTS

| 1,749,266 | 3/1930 | Sontag | 261/113 |
| 3,243,171 | 3/1966 | Eckert | 261/97 |

FOREIGN PATENT DOCUMENTS

| 26,584 of | 1907 | United Kingdom | 261/113 |
| 1,215,606 | 3/1970 | United Kingdom | 261/97 |

OTHER PUBLICATIONS

Montgomery Ward – Fall and Winter 1973, p. 746, FIG. 23.

Primary Examiner—Tim R. Miles
Assistant Examiner—Gregory N. Clements
Attorney, Agent, or Firm—Smith and Carothers

[57] ABSTRACT

A gas-liquid contact tower comprises an outer tower shell and a plurality of superimposed generally horizontal contact plates within the tower shell. The plates are grouped into at least one sub-assembly thereof, and an arrangement is provided for removably supporting the plate assembly within the tower shell. A baffle arrangement is mounted within the tower shell and adjacently overlying the plate sub-assembly and is shaped to minimize or substantially preclude splashing of the shell walls. The baffle arrangement includes a cylindrical section closely but removably fitted within adjacent wall surfaces of the tower shell and a frustoconical section for directing fluid from the cylindrical baffle section onto a contact plate immediately underlying the baffle arrangement. The cylindrical baffle section has sufficient height to afford that flow resistance which would substantially preclude flow of condensible vapor between the adjacent wall surfaces and the baffle arrangement.

12 Claims, 5 Drawing Figures

PREVENTING WALL LEAKAGE IN CONTACT TOWERS

The present application is similar in certain respects to our copending application for Contact Towers with Leak-Proof Support of Improved Plate Subassembly, Ser. No. 589,906, filed concurrently herewith.

The present invention relates to multiple-plate, vapor or gas-liquid contact towers of the type wherein a relatively large number of contacting plates are arranged in one or more removably mounted sub-assemblies of closely spaced plates. Contact towers of this general configuration are described in the U.S. Pat. Nos. 3,075,752 and 3,367,638 granted to Dr. Max Leva and also in his copending application Ser. No. 367,133 for Gas-Liquid Contact Apparatus, filed June 5, 1973.

Although the contact tower of the invention is described primarily with reference to vapor-liquid phases, the invention is generally applicable to towers handling gas-liquid phases, and the like. The term "gas-liquid" when employed herein is therefore inclusive of the various "vapor-liquid" relationships as applied to contact towers.

In a typical, but nonlimiting, application of contact towers, a feed stock of closely boiling liquids is introduced to the tower, often at a location adjacent the midpoint of its overall height. The feed stock can consist, for example, of ortho and para variants of numerous aromatic liquids. Other closely boiling miscible liquids in various proportions can also be introduced. Typically but not necessarily the feed stock of a distillation tower may consist of a mixture of miscible liquids having boiling points within 1 or 2° Fahrenheit. (In other contact tower applications, immiscible liquid, vapor-liquid or gas-liquid feed stocks can be handled). Upon introduction to the contact tower, the higher boiling liquid descends to the bottom of the tower through numerous contact plates, while the lower boiling liquid vaporizes and, passing likewise through numerous contact plates ascends to the top of the tower. A condenser-reflux arrangement supplies the liquid phase in the upper region of the tower, and a reboiler system supplies the vapor or gaseous phase in the lower reaches of the contact tower.

In high purity operations, a lower boiling top product or distillate can be extracted from the top of the tower having only 20ppm or less of the higher-boiling component as a contaminant. Conversely the higher-boiling bottom product may contain only 20ppm or less of the lower-boiling liquid as contaminant.

A very serious problem arises in the operation of contact towers in that relatively small amounts of liquid, either from splashing or condensation at the tower walls, frequently descend along the inner wall surfaces of the enclosing vessel and thus by-pass the many contact plates in the lower regions of the tower. This wall leakage can descend directly to the bottom of the contact tower where it will severely contaminate the bottom product. In high purity operations, it will be evident that a very minor amount of leakage at the inner wall surfaces of the tower can contaminate the bottom product to an extent far beyond the aforementioned 20ppm or other specification of trace contamination.

Unfortunately the contact plates cannot be peripherally and permanently sealed to the inner wall surfaces of the contact tower as removability is prerequisite to cleaning and maintenance of the tower. Moreoer, upon heating of the contact tower the shell or vessel walls and the perimetric edges of the plates expand unequally, which would disrupt any such permanent sealing.

It has been proposed to form bundles of contacting plates joined by tie-rods, with the plates separated by peripheral sealing rings. Each of the plate bundles are then sealed to the inner wall surfaces of the tower vessel by means of a large-diameter, resilient or elastic O-ring (contact towers typically are from one or two feet to ten or fifteen or more feet in diameter). The thermal cycling of the contact tower, however, causes the O-ring or other sealing ring or packing to lose much of its elasticity or resiliency, with the result that the aforesaid wall leakage develops within a comparatively short time. Many feed stocks employed in contacting towers cause the aforementioned O-rings or other packing arrangements to become relatively brittle which accelerates the development of wall leakage.

Differences in thermal expansions between the O-ring housing, the O-ring itself and the vessel walls likewise accelerate development of wall leakage. In many cases heating or thermal cycling of the contact tower causes distortions of the walls of the contact vessel to accentuate out-of-round tolerances to the extent that a leakage path can be formed even though the O-ring material has not entirely lost its elasticity or resiliency.

In those contact towers having spaced sub-assemblies of contact plates the wall leakage problem is aggravated by condensation of the vapor phase on the relatively cooler inner wall surfaces of the vessel or tower shell between the plate sub-assemblies.

The thermal cycling of the contact tower together with attack by feed stock chemicals, causes the O-rings to shrink and harden over longer or shorter periods of time depending on the particular feed stock and the material of the O-rings. In consequence, the O-rings can lose contact with the adjacent vessel walls at one or more locations about the periphery of the O-rings, with resultant wall leakage.

The aforementioned problems and difficulties of the prior art are solved by our present invention, whereby a baffle arrangement for minimizing or preventing splashing and wall leakage is mounted in one or more intervening spaces among the separated plate sub-assemblies of a typical contact tower. The baffle arrangement of the invention not only prevents virtually all condensation of vapor phase flowing upward through the tower but also largely prevents splashing of the tower walls by liquid falling from an overlying plate sub-assembly or from the feed stock inlet. In another arrangement of the invention, the baffle arrangement is modified to accommodate a number of guide rods extending between spaced sub-assemblies of contact plates in the tower. Individual components of the baffle arrangement of the invention are arranged for ready installation and removability to permit replacement of plate subassemblies and other maintenance of the contact tower.

We attain these desirable ends by providing a gas-liquid contact tower comprising an outer tower shell, a plurality of superimposed generally horizontal contact plates within said tower, said plates being grouped into at least one subassembly thereof, means for removably supporting said plate subassembly within said tower shell, and a baffle arrangement mounted within said tower shell and adjacently overlying said plate subassembly, said baffle arrangement including a cylindrical section closely but removably fitted within adjacent inner wall surfaces of said tower shell and a frustoconical section for directing fluid from said cylindrical baffle section onto a contact plate immediately underlying said baffle arrangement, said baffle arrangement being thereby shaped to minimize or substantially preclude splashing of said shell walls, said cylindrical section having sufficient height to afford that relative flow resistance which would substantially preclude flow of condensible vapor between said shell wall surfaces and said baffle arrangement.

We also desirably provide a similar contact tower wherein an upper end of said cylindrical baffle section terminates closely adjacent an underside of an overlying plate subassembly.

We also desirably provide a similar contact tower wherein a number of said baffle arrangements are provided respectively in a like number of spaces among a plurality of plate subassemblies.

We also desirably provide similar means for preventing wall leakage in contact towers wherein continuous guide rods for a number of said subassemblies extend uninterruptedly through said space and through apertures therefor in said frustoconical baffle section.

We also desirably provide similar means for preventing wall leakage in contact towers wherein dam members respectively surround said guide-rod apertures and are closely fitted about the associated guide rods.

We are not aware of any patent or literature reference disclosing any of the novel arrangement pointed out above.

During the foregoing discussion, various objectives, features and advantages of the invention have been set forth. These and other objectives, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same wherein.

Figure 1:
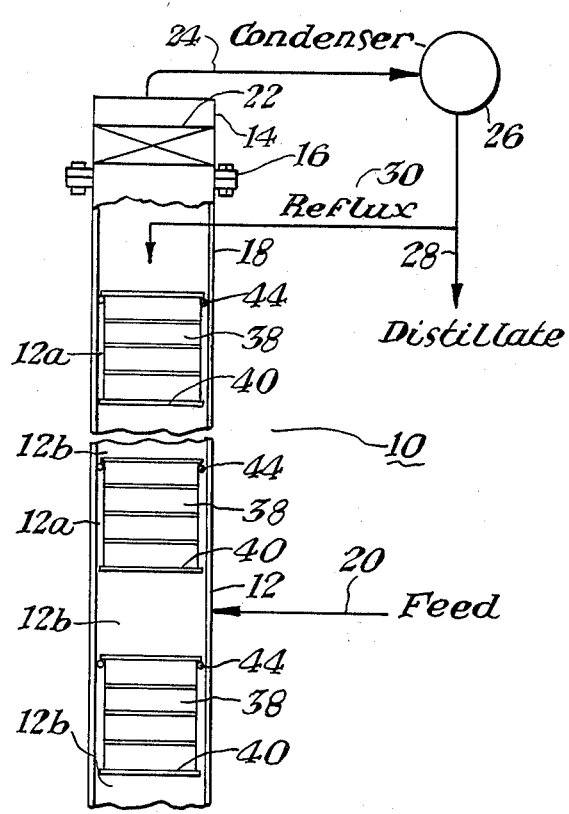
FIG. 1 is a schematic view of an exemplary contact tower arrangement, as employed in the prior art.

With preliminary reference to FIG. 1 of the drawings a typical vapor-liquid contacting arrangement 10 (as employed by the prior art) includes an elongated tower shell or vessel 12 which can be from 5 feet to 200 feet or more in height and from about 1 or 2 feet to 10 or 15 feet or more in diameter. The vessel 12 includes a header or cap 14 secured at 16 to a main body portion 18 of the vessel. A suitable feed stock can comprise closely boiling components. This feed stock may either be all liquid at its boiling point, or it may be superheated and thereby may flash partly into vapor, when entering the column or tower, in this example at the mid-section of the vessel 12, as denoted by arrow 20.

The top product is withdrawn through an entrainment separator 22 (arrow 24) to condenser 26 from which the distillate or lower boiling component of the feed stock can be withdrawn (arrow 28). Usually a portion of the distillate is refluxed to the tower (arrow 30) for greater purity and for working liquid. This liquid is administered to the top sub-assembly 38 by virtue of a liquid distributor or conventional design (not shown). At this liquid distributor, small accounts of liquid will normally splash sidewise and thereby make contact with the vessel wall, where the splashed-on liquid will form a film of liquid that flows downward along the wall to the top of the O-ring arrangement 44. Between plate sub-assemblies 38 the liquid will emerge again and fall by gravity to the top of the sub-assembly below and a similar splashing to the wall will occur as has already been described for the entrance point of the reflux. Obviously if the O-ring gaskets or other sealing media are no longer liquid-tight, a portion of the liquid will thus pass down the annular space 12A, and will thereby shortcircuit passage through the column internally, and will mechanically carry a certain portion of the low-boiling component down into the base of the column or contact tower, and thereby contaminate the bottom product. Similar splashing and short-circuiting can occur at the introduction of the feed stock 20.

Similarly a bottom product or higher boiling component of the feed stock is withdrawn from the bottom of the vessel 12 (arrow 32). A portion of the bottom product can be returned adjacent the bottom of the tower (arrow 34) through reboiler 36 to increase the purity of the bottom product and to provide working vapor. This vapor rising through the sub-assemblies 38 will have to pass through a short section 12B of shell height, that is, intermediate the sub-assemblies 38. Since the inside column wall that is thus exposed to the vapor flow upward is somewhat cooler than the main mass of the vapor a portion of the vapor will condense at the exposed inside wall surface, and form a liquid film on the inside wall surface that will then flow downward to the top of the underlying O-ring arrangement, where it should be stopped and diverted back to the top of the sub-assembly. Obviously if that O-ring arrangement or other peripheral seal no longer makes a liquid-tight contact with the inner column wall the liquid film thus formed will flow downward and bypass the sub-assemblies in a similar fashion as has already been described in connection with the splashing reflux. Hence bottom liquid contamination may also be caused by vapor condensation at the inner vessel wall surfaces.

Numerous contact plates are mounted in the tower 12 between the locus of feed stock introduction and the top and bottom portions of the tower 12, respectively. Typically these contact plates are grouped into the aforementioned sub-assemblies denoted generally by reference numerals 38. The sub-assemblies 38 can be assembled in a conventional manner or as set forth in Dr. Max Leva's aforementioned patents and application. In a typical configuration the plate sub-assemblies include a relatively heavy bottom supporting plate 40 resting on suitable supports (not shown) secured to the inner wall surface of the tower shell 12. Desirably the sub-assemblies 38 rest on such supports by gravity for ready removability in the event that cleaning or other maintenance of the tower 12 is required. Although four such sub-assemblies 38 have been illustrated it will be appreciated that a different number of the sub-assemblies can be employed, and frequently a much larger number of plate sub-assemblies are employed in a typical application.

As indicated above, attempts have been made in the past to seal each plate sub-assembly 38 to the inner wall surfaces of the vessel 12 by means of O-ring or packing type seals denoted generally in FIG. 1 by the reference numerals 44. For certain applications, for example, high purity operations, these seals have been unsatisfactory, for reasons mentioned above, in that sooner or later the seals 44 allow leakage along the inner wall surfaces of the vessel 12 which bypasses one or more of the plate sub-assemblies and eventually descends to the bottom of the vessel 12 where it severely contaminates the bottom product. The leakage liquid, not having passed properly through the plate sub-assemblies, contains a high proportion of the lower-boiling or contaminating component of the feed stock.

Figure 2:
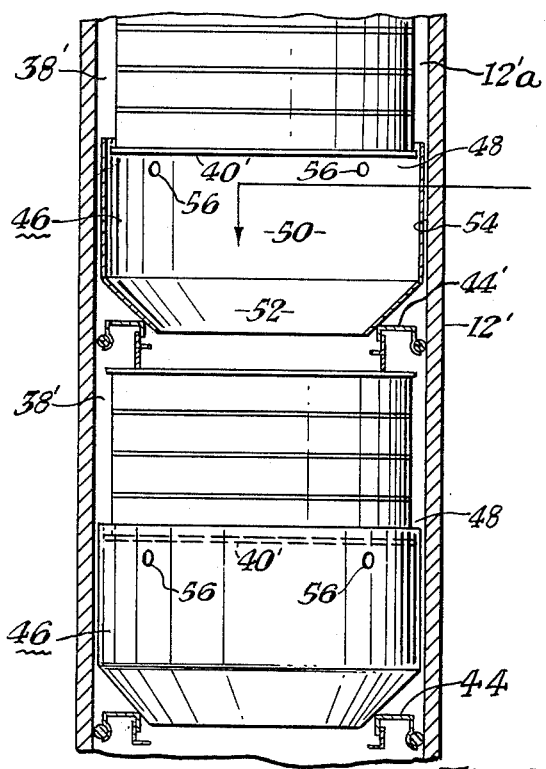
FIG. 2 is a partial vertically sectioned view of a contact tower arranged in accordance with our invention.

This problem is solved by the present invention in an unexpected manner by provision of uniquely shaped baffle arrangements 46 as shown in FIG. 2 of the drawings. Each baffle arrangement 46 is mounted in an associated space 48 within the tower 12' and between an adjacent pair of the plate sub-assemblies 38', or in overlying relation with respect to a single subassembly. As mentioned previously the plate sub-assemblies 38' can be conventional in construction or they can be fashioned after the manner of the aforementioned patents and application. The baffles 46 prevent splashing of the vessel walls by liquid falling from an overlying plate sub-assembly, or from the feed and reflux inlet, (Figures, arrows 20, 30). Accordingly, the baffles 46 are advantageously employed between every adjacent pair of the sub-assemblies 38', for this purpose alone.

In this example of the invention, each baffle 46 includes a cylindrical section 50 joined to a frustoconical section 52 of the baffle arrangement. The cylindrical section 50 is closely but removably fitted within the adjacent inner wall surface of the shell 12'. The very narrow passage 54 thus formed between the inner wall of the vessel 12' and the outer cylindrical surface of the baffle arrangement 46 provides in effect a virtual seal against the passage of wall leakage, owing to the very high fluid resistance to any tendency of vapor to flow through the annular passage 54, in contrast to the very low resistance flow path through the baffle 46 itself. In a typical application the radial width of the annular passage 54 can be in the range of about 1-5mm. In a given application, the height of the cylindrical section 50 will of course be adjusted to the size of the contact tower 12' and the distance between individual plate subassemblies 38'. The minimum height of the cylindrical section 50 will depend on the actual radial width of the annular passage 54 and on the inside diameter of a given tower 12'. With the teachings of the present invention, an artisan can readily and accordingly calculate that minimum height for each tower size and application, which would induce the aforementioned very high fluid resistance. Thus, any wall leakage from condensation at the cooler vessel wall surfaces can be substantially precluded, and any splashed liquid or other liquid is collected within the baffle 46 and is directed by the frustoconical section 52 onto the upper plate of the immediately underlying sub-assembly.

Each of the baffles 46 rests for ready removability upon a conventional peripheral sealing arrangement 44' of the underlying plate sub-assembly 38' or alternatively on appropriate supporting and sealing arrangement described and claimed in our copending application entitled CONTACT TOWERS WITH LEAKPROOF SUSPENSION OF IMPROVED PLATE SUB-ASSEMBLY, Ser. No. 589,906, filed concurrently herewith. In any event the baffles 46 can be readily removed from the tower shell 12' along with the alternating array of plate sub-assemblies 38'. Lifting apertures 56 can be provided in each of the baffles 46 for this purpose.

Figure 3:
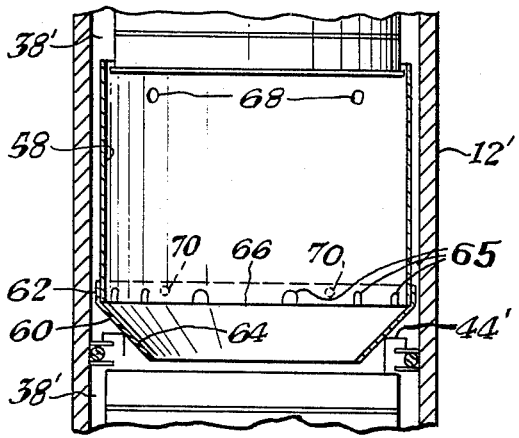
FIG. 3 is a similar view of a modified form of our novel contact tower.

In FIG. 3 of the drawings another form of our baffle arrangement is shown and includes an upper, substantially cylindrical baffle component 58 and a lower, frustoconical component 60. A number of the baffle arrangements 58, 60 can likewise be employed in an alternating array with the plate sub-assemblies 38' as in the preceding figure. The upper baffle component is substantially cylindrical in configuration and is closely but removably fitted within the inner wall surfaces of the tower shell or vessel 12'. Desirably the upper baffle component 58 extends closely to the underside of the immediately overlying plate sub-assembly 38' in order to provide a more advantageous splash shield and even higher resistance against flow of condensible vapors around the cylindrical component 58. In a preferred arrangement, as shown in FIG. 3, the upper end of each baffle section 58 loosely surrounds the lowermost plate of the overlying plate sub-assembly and thereby extends a short distance into the annular space 12'a between the sub-assembly and the vessel wall. The baffle arrangement 58-60 therefore covers essentially all of the exposed inner surfaces of the vessel wall between adjacent plate sub-assemblies 38' to minimize condensation on the relatively cooler vessel wall.

The lower component 60 of each baffle arrangement can be shaped similarly to the baffle 46 of FIG. 2. A cylindrical lip portion 62 of the lower baffle component 60 can however be of much less elevation, as the lower end of the upper baffle component 58 is inserted therein and rests upon the upper frustoconical surface of the frustoconical section 64 of the lower baffle component. In many applications, the lip 62 can be omitted, as a radially outward extension of the frustoconical surface will afford a centering action for sealing the upper baffle components 58 on the lower component 60. In any event such insertion is desirably a loose one so that any condensate or other leakage flowing down the outer cylindrical surface of the upper baffle component 58 will be direected into the lower baffle component and onto the upper plate of the immediately underlying subassembly 38'. In furtherance of this purpose the upper or cylindrical baffle component 58 can be scalloped to define discrete flow passages 65 in the lower edge portion for such leakage.

As noted previously, the upper baffle component 58 rests upon the lower baffle component 60, which in turn rests upon the conventional sub-assembly seal 44' or upon the sub-assembly support and seal structure of our aforementioned companion application Ser. No. 589,906. With this mounting arrangement the baffle arrangements 58, 60 can be readily removed from the tower 12' by means of lifting apertures 68 in the upper baffle component 58 and lifting apertures 70 in the lower baffle component 60. It will be understood however that the baffle arrangement 58, 60 can be supplied in one piece, after the manner of FIG. 2 or FIG. 4.

Figure 4:
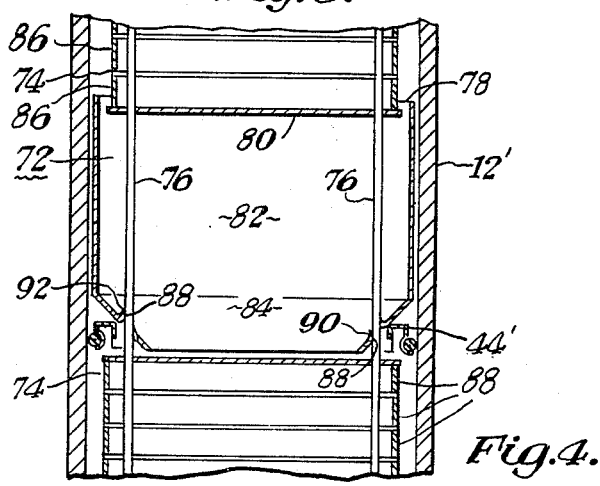
FIG. 4 is a similar view of a further modification of our novel tower.

With reference now to FIG. 4, another form of our novel baffle arrangement 72 can be employed between plate subassemblies 74 having a number of continuous guide rods 76 passing uninterruptedly therethrough, either after the manner of the aforementioned Leva application Ser. No. 367,133 or otherwise. The baffle arrangements 72 can be formed in a one-piece construction after the manner of FIG. 2 or in a two-piece construction following the teachings of FIG. 3. Desirably the upper edge 78 of each baffle 72 terminates adjacent the bottom of the immediately overlying plate subassembly 74 and, as noted above, can extend a short distance into the annular space surrounding the subassembly. The cylindrical portion 82 of each baffle 72 is closely but removably fitted within the inner wall surfaces of the vessel 12', for the reasons mentioned above. The frustoconical portion of each baffle 72 likewise can rest on the immediately underlying plate subassembly 74, in particular its peripheral sealing arrangement 44' as noted previously.

Owing to the close-fitting construction of each baffle 72, the cylindrical portion 82 thereof is avoided by the afore-mentioned guide rods 76 passing through two or more of the plate sub-assembly 74 and inwardly of their sealing rings 86, and uninterruptedly through the vessel space between the adjacent sub-assemblies. However, the frustoconical sections 84 of the baffles 72 unexpectedly accommodate passage of the guide rods 76 therethrough. One arrangement for accomplishing such passage includes the provision of closely fitting apertures 88 in the frustoconicl sections 84. By surrounding these apertures with dams 90, as it were, leakage flowing downwardly along the inside surfaces of the baffles 72 is prevented from reaching the guide rod apertures 88.

Figure 4A:
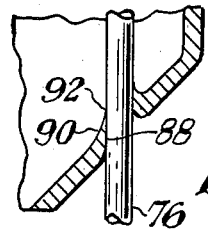
FIG. 4A is an enlarged partial view of a portion of the contact tower as shown in FIG. 4.

The dams 90 can be provided as discrete components secured about the guide rod apertures 88, as by welding or the like. Alternatively and preferably, the dams 90 are extruded portions of the material comprising the frustoconical sections 84 and are formed concomitantly with formation of the guide rod apertures 88. Most desirably such extrusions form dams 90 with more or less feathered edges 92 (FIG. 4A) which in any event closely engage the adjacent surfaces of the guide rods 76 to seal the apertures 88 against liquid flowing downwardly along the guide rods 76 or otherwise passing downwardly through the baffles 72. The close engagement between the guide rods 76 and the baffles 72 thus afforded moreover serves to stabilize the assembly of contact plates, guide rods 76 and baffles 72 within the tower shell 12'. The feathered edges 92 deflect any liquid that may have run downward on the guide rods 76 away from the guide rod surfaces and outwardly to the top of the associated sub-assembly.

From the foregoing it will be seen that novel and efficient arrangements for Preventing Wall Leakage in Contact Towers have been disclosed and described. The descriptive and illustrative materials employed herein and utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A gas-liquid contact tower comprising an outer tower shell, a plurality of superimposed generally horizontal contact plates within said tower, said plates being grouped into at least one subassembly thereof, means for removably supporting said plate subassembly within said tower shell, and a baffle arrangement mounted within said tower shell and adjacently overlying said plate subassembly, said baffle arrangement including a cylindrical section closely but spacedly and removably fitted within adjacent inner wall surfaces of said tower shell and a frustonconical section for directing fluid from said cylindrical baffle section onto a contact plate immediately underlying said baffle arrangement, said baffle arrangement being thereby shaped to minimize or substantially preclude splashing of said shell walls, said cylindrical section having sufficient height to afford that flow resistance which would substantially preclude flow of condensible vapor through an annular space between said shell inner wall surfaces and outer surfaces of said cylindrical baffle section.

2. The combination according to claim 1 wherein a plurality of said subassemblies are mounted at vertically spaced locations within said tower shell, a number of said baffle arrangements are provided respectively in a like number of spaces among said plate subassemblies.

3. The combination according to claim 1 wherein said baffle arrangement rests by gravity upon an immediately underlying plate subassembly.

4. The combination according to claim 3 wherein the frustoconical section of said baffle arrangement rests upon a peripheral sealing arrangement of said underlying subassembly.

5. The combination according to claim 2 wherein continuous guide rods for a number of said subassemblies extend uninterruptedly through at least one of said spaces and through apertures therefor in the frustoconical baffle section therein.

6. The combination according to claim 5 wherein dam members respectively surround said guide rod apertures and are secured and sealed to said frustoconical section.

7. The combination according to claim 6 wherein said dam members are closely fitted about the associated guide rods.

8. The combination according to claim 1 wherein the cylindrical and frustoconical sections of said baffle arrangement are respectively discrete components, said frustoconical component including a peripheral upper edge projecting radially outwardly of said cylindrical component and said cylindrical component having a lower end portion seated within said peripheral edge, said cylindrical component resting upon the inside frustoconical surface of said frustoconical component.

9. The combination according to claim 8 including an upwardly projecting lip extending about said peripheral edge, the lower end portion of said cylindrical component being loosely interfitted within said lip.

10. The combination according to claim 8 including flow passages formed in a lower edge portion of said cylindrical component.

11. The combination according to claim 1 wherein an upper end of said cylindrical baffle section terminates closely adjacent an underside of an overlying plate subassembly.

12. The combination according to claim 1 wherein an upper end portion of said cylindrical baffle section loosely surrounds a lower end portion of an overlying plate sub-assembly.

* * * * *